Patented Nov. 21, 1939

2,181,046

UNITED STATES PATENT OFFICE 2,181,046

DIHALOGEN QUINIZARINS

Edwin C. Buxbaum, Shorewood, Wis., assignor to E. I. du Pont de Nemours & Company, Wilmington, Del., a corporation of Delaware No Drawing. Application July 24, 1937, Serial No. 155,573

4 Claims. (Cl. 260—383)

This invention relates to the preparation of new and valuable dyestuff intermediates of the anthraquinone series and has for its object the preparation of new heteronuclear beta, beta-dihalogen quinizarins of the following general formula

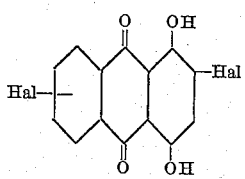

in which the second halogen atom is attached to the second benzene ring of the anthraquinone nucleus in a beta position.

I have found that new dihalogen quinizarin compounds may be produced by the direct halogenation of quinizarin and that these new dihalogen compounds serve as valuable intermediates for the preparation of new and valuable dyestuffs not obtainable from the intermediates heretofore known in the prior art.

While dihalogen quinizarins are known in which both halogen atoms are attached in the opposite benzene nucleus of the anthraquinone molecule from the one to which the hydroxyl groups are attached, or to the 2,3 positions in the same benzene ring of the molecule, these compounds exhibit different physical and chemical properties than those I have prepared.

Although the direct halogenation of quinizarin to give monochloroquinizarin is disclosed in U. S. Patent 1,504,165, it was not suggested in that patent that good yields of a very pure dihalogen quinizarin could be obtained if the halogenation were continued until two atoms of halogen were introduced. It is known that in the chlorination of quinizarin the introduction of chlorine beyond one molecule tends to give a very impure product which is difficult to isolate, and therefore chlorination to a monochloro derivative was heretofore carefully controlled. I have found, however, that on the introduction of sufficient halogen in the quinizarin molecule to give dihalogen compounds, highly crystalline bodies are obtained which separate from the mass readily and in pure form, and are valuable as dyestuff intermediates for the preparation of new colors, particularly for the dyeing of wool and acetate silk. Although it has been impossible to determine whether the second halogen atom introduced into the molecule is in the 6 or 7 position, it has been quite definitely established that it is in one of those positions, since on synthesizing the dihalogen quinizarin from 4-halogen phthalic anhydride and dichlorophenol compounds are obtained which on further condensation give dyestuffs of a very similar shade to those obtained on similar condensation of the dihalogen compounds obtained by the direct halogenation of quinizarin, although the synthetically prepared compounds are obviously in a less pure form.

The new heteronuclear beta, beta dichloroquinizarin is preferably prepared by carrying out the chlorination in sulfuric acid of from 78% to weak oleum, in the presence of iodine as a catalyst, sufficient chlorine being introduced to complete the reaction. Bromination is preferably effected in nitrobenzene with bromine and sulfuryl chloride as an oxidizing agent. In both cases the resulting halogen compound separates out in well defined crystals which on washing free from the solvent employed are in very pure form.

This invention is illustrated more fully by the following examples. The parts used are by weight.

Example 1

100 parts of quinizarin are suspended in 600 parts of sulfuric acid monohydrate. When the quinizarin has been thoroughly dissolved, 1 part of iodine is added. The mass is stirred for one-half hour and then chlorine is added at a rate to dichlorinate the quinizarin in about 15 hours. When the chlorine content reaches 22.9%, the mixture is cooled to room temperature and poured into 6000 parts of cold water, filtered, washed acid-free, and dried. On recrystallization from 80% sulfuric acid it is obtained as an orange colored crystalline body with a melting point of 249–250° C.

Example 2

150 parts of pure quinizarin are suspended in 1500 parts of sulfuric acid monohydrate and thoroughly agitated until completely suspended. 3 parts of iodine are then added. Sufficient chlorine is then slowly added at a temperature of 70–80° C. until chlorination is complete. The chlorination mass is then diluted with 430 parts of water, keeping the temperature between 70 and 80° C. by controlled addition of the water. After the dilution has been completed, the mass is allowed to agitate over night and is then filtered on carborundum, washed with 78% sulfuric acid and then sludged in hot water. The precipitated dichloroquinizarin is filtered, washed acid-free and dried. It is a highly crystalline orange compound which melts at 249–250° C.

Example 3

100 parts of pure quinizarin are suspended in 800 parts of 98% sulfuric acid and agitated until suspension is complete. 1 part of iodine is added and the reaction mass is heated to 90–95° C. Chlorine is passed into the mixture slowly for 15 hours at 90–95° C. until dichlorination is complete. 200 parts of water are added at 70–75° C. and the precipitated crystalline mass is allowed to agitate 12 hours. It is then isolated as in the preceding example.

Example 4

480 parts of crude quinizarin are added to 960 parts of nitrobenzene and the temperature is raised to 135–140° C. over a period of 1 hour. It is held at this temperature until dehydration is complete and then cooled to 85° C. 4.2 parts of iodine are added over a period of 3 to 5 hours, a mixture of 360 parts of bromine and 320 parts of sulfuryl chloride is slowly added. After the bromination mixture has been added, the mass is agitated for 8 hours at 85° C. It is then cooled to 20° C. and filtered. The crystalline cake is washed free from nitrobenzene with ethyl alcohol, sludged in hot water, filtered and dried. The dibromoquinizarin formed is a highly crystalline red-brown compound which melts at 225–227° C. The diacetoxydibromoanthraquinone formed by heating with acetic anhydride and a trace of sulfuric acid is an almost colorless compound which melts at 250–250.6° C.

I claim:

1. A dihalogen quinizarin of the following general formula

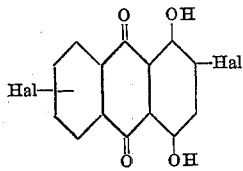

wherein the second halogen atom is in one of the positions 6 and 7, said compound being substantially pure in form and free from isomeric compounds.

2. A dichloroquinizarin of the following general formula

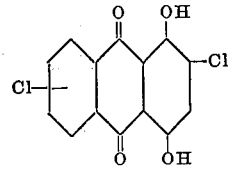

wherein the second chlorine atom is in one of the positions 6 and 7, said compound having a melting point of from about 249 to 250° C.

3. A dibromoquinizarin of the following general formula

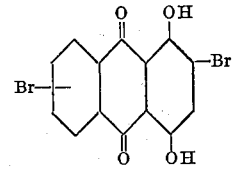

wherein the second bromine atom is in one of the positions 6 and 7, said compound having a melting point of from about 225 to 227° C.

4. The process for preparing dihalogen quinizarins which comprises reacting upon quinizarin with halogen until two atoms of halogen have been introduced into the molecule.

EDWIN C. BUXBAUM.